US009645018B2

(12) United States Patent
Lee (10) Patent No.: US 9,645,018 B2
(45) Date of Patent: May 9, 2017

(54) METHOD AND APPARATUS FOR AUTO-CORRECTING THE DISTRIBUTED TEMPERATURE SENSING SYSTEM (71) Applicant: Chung Lee, Austin, TX (US)

(72) Inventor: Chung Lee, Austin, TX (US)

( * ) Notice: Subject to any disclaimer, the term of this patent is extended or adjusted under 35 U.S.C. 154(b) by 572 days.

(21) Appl. No.: 14/182,533

(22) Filed: Feb. 18, 2014

(65) Prior Publication Data
US 2014/0233600 A1 Aug. 21, 2014

Related U.S. Application Data (60) Provisional application No. 61/766,639, filed on Feb. 19, 2013.

(51) Int. Cl.
*G01K 15/00* (2006.01)
*G01J 5/00* (2006.01)
*G01K 11/32* (2006.01)

(52) U.S. Cl.
CPC ............ *G01K 15/005* (2013.01); *G01K 11/32* (2013.01)

(58) Field of Classification Search
USPC ............................................. 374/1, 131, 161
See application file for complete search history.

(56) References Cited

U.S. PATENT DOCUMENTS

| | | | | |
|---|---|---|---|---|
| 7,126,680 B2* | 10/2006 | Yamate | ................... | G01K 11/32 356/73.1 |
| 7,744,275 B2* | 6/2010 | Kawauchi | ................. | G01J 5/08 374/121 |
| 7,874,725 B2* | 1/2011 | Komeda | ................. | G01K 11/32 374/1 |
| 8,529,123 B2* | 9/2013 | Hill | ......................... | G01K 11/32 374/1 |
| 9,002,152 B2* | 4/2015 | Jaaskelainen | .......... | G01K 11/32 374/161 |
| 2003/0234921 A1* | 12/2003 | Yamate | ................... | G01K 11/32 356/73.1 |
| 2007/0223556 A1* | 9/2007 | Lee | .......................... | G01K 11/32 374/1 |
| 2010/0128756 A1* | 5/2010 | Lee | .......................... | G01K 11/32 374/161 |
| 2010/0312512 A1* | 12/2010 | Ajgaonkar | ............. | G01K 15/00 702/99 |
| 2011/0231135 A1* | 9/2011 | Suh | ......................... | G01K 11/32 702/99 |
| 2011/0280277 A1* | 11/2011 | Chung | ................... | G01K 11/32 374/137 |
| 2013/0156066 A1* | 6/2013 | Kwon | ..................... | G01K 11/32 374/161 |

(Continued)

*Primary Examiner* — Mirellys Jagan
(74) *Attorney, Agent, or Firm* — Richard A. Fagin (57) ABSTRACT

System and method for correcting the potential errors occurring in a fiber optic temperature measurement system are disclosed. In one respect, a dual light sources configuration is provided. The primary light source may illuminate a sensing fiber, and an Anti-Stokes band may be detected. The secondary light source may illuminate a sensing fiber, and a Rayleigh band may be detected, where the Rayleigh band is substantially wide enough to cover the Anti-Stokes band of the primary light source. A ratio between these Anti-Stokes and the Rayleigh bands may be used to measure the temperature and undesired errors due to the perturbations falling on the sensing fiber is continuously corrected.

9 Claims, 6 Drawing Sheets (56) References Cited

U.S. PATENT DOCUMENTS

2013/0209029 A1* 8/2013 Mitchell ............ G01D 5/35387
  385/15
2015/0300891 A1* 10/2015 Mitchell ................ G01K 11/32
  356/73.1

* cited by examiner

METHOD AND APPARATUS FOR AUTO-CORRECTING THE DISTRIBUTED TEMPERATURE SENSING SYSTEM

CROSS-REFERENCE TO RELATED APPLICATIONS

This applications claims priority to U.S. Provisional Patent Application Ser. No. 61/766,639, filed Feb. 19, 2013, which is hereby incorporated by reference in its entirety.

FIELD OF THE INVENTION

The present invention relates generally to temperature sensing. More particularly, the present disclosure relates to system for automatically correcting the temperature measurement in a distributed system.

BACKGROUND OF THE INVENTION

Optical fibers have been used mainly for optical communication systems for decades. Recently, optical fiber sensing technologies have grown rapidly due to their advantages over conventional sensing devices. The optical fiber sensors can handle much higher signal bandwidth and temperature ranges, are immune to electromagnetic interference noises, provide safe operation (no generation of electric sparks which occasionally induce catastrophic fire incidents), and require a much easier installation process. But the most prominent feature is their capability of true distributed parameter measurement i.e., the extended ranges' temperature monitoring can be covered with a single fiber optic cable. Utilizing this distributed technology, temperature or other parameter's profile along significant distances can be monitored continuously without any electric wire involvement. Many temperature data points can be processed along over 10 kilometers within a short time. The resultant distributed measurement is equivalent to the performances of thousands of 'point temperature' sensors, which usually are susceptible to electric noises, occasional fire incidents due to wire shorted circuits and complicated installation—costly and take long periods of time. Thus the fiber optic distributed sensing system provides for long range temperature measurement with reliable performance, safe operation and economic installation.

When a laser light with a center wavelength (1) is injected into a fiber cable, most of the light is transmitted, but small portions of incident lights are scattered backward or forward along the fiber. These scattered lights are categorized into three unique spectral bands—Rayleigh, Brillouin and Raman bands. For the measurement of distributed temperature, typically few components such as Rayleigh (1R, insensitive to temperature), Stokes (1S, longer than 1R and less sensitive to temperature) and anti-Stokes (1AS, shorter than 1R and most sensitive to temperature) of Raman band have been used. These optical signals may be separated by optical filters (or other wavelength selecting devices) and are received by the photo detectors to convert light to electrical signals. The temperature can be calculated by the ratio of temperature sensitive anti-Stokes to less sensitive Stokes or temperature insensitive Rayleigh components.

To obtain the temperature profile along the distance, two processing methods—time domain processing approach and frequency domain approach have been applied conventionally. The time domain method (or OTDR—Optical Time Domain Reflectometry) uses pulsed light source, and the location of the temperature is identified by the calculation of the pulse's round trip time to the distance under test. The frequency method (OFDR—Optical Frequency Domain Reflectometry) uses a modulated laser source, and the position can be calculated by applying the inverse Fourier transformation of the sensing fiber's transfer function or the frequency response. The OTDR method is a one step process and provides quicker response time but needs high pulse energy to obtain high SNR (signal to noise ratio). OFDR method takes longer process time because it is a two step process (convert from frequency domain to time domain), but higher light power can be applied to increase the SNR. Also random pulse coded (multiple pulses) based on time domain methods can be applied. All approaches have their pros and cons, and the selection may depend on the application.

Even though the DTS has been widely applied to many areas so far, two critical issues should be handled properly for reliable long term measurement. The first issue is the inherent characteristics of anti-Stokes band, which are not only sensitive to temperature variation but also to physical perturbations, which induce the attenuation of the light transmitting along the fiber. This ambiguity can be corrected by using another reference light source(s), whose Rayleigh band 12R (only sensitive to the attenuation only) is located in Stokes or anti-Stokes band of the first light source, 11AS. The second issue is the DAF (Differential Attenuation Factor) due to the material characteristics of optical fiber. For given external perturbations, all transmitting light in the fiber cable including wavelengths of 1R, 1S and 1AS experience different attenuations. Typically, the shorter the operating 1 is, the higher the attenuations are. These phenomena should be considered and handled properly for reliable temperature calculation by the ratio of 1AS to 1S or 1AS to 1R bands. Typically this effect is corrected just after the sensing fiber is deployed. But in many real application cases, various perturbations are applied or generated unintentionally to the section of sensing fiber cable times after deployment. These environmental effects are called the 'darkening' in a local section or sections of the fiber and induce different attenuation values to each 1, resulting in erroneous temperature profile. Those effects may be: radiation related darkening, hydrogen gas related darkening and additional stresses applied on the arbitrary length of the fiber cable. Therefore this phenomenon should be corrected automatically (or self corrected) and continuously for accurate measurement. To correct DAF related errors, the DE (Dual End) method has been applied, which is implemented by two channel configuration (Ch1 and Ch2 are used for a sensing) and utilizes common loss compensation method between these 2 channels. After the primary laser light is injected to Ch1 and Ch2 consecutively by a switching device, the detected signal of Ch2 (or either one) is rotated in mirror image and subtracted (common attenuations) from the other channel, removing the error. The issue of this method is the requirement of two channels, which requires twice the measurement time, double the length of sensing fiber and twice the optical budget. Also DE configuration is not permissible for some critical applications. Finally, the temperature effect of the Stokes band is subtracted for high temperature measurement because the Stokes band is still dependent on temperature even though it is not as sensitive as the AS band.

The major trend of temperature calculation has been utilizing the ratio (R) of AS to S band because their light intensities (IS and I AS) are comparable to each other. It is expressed mathematically as:

$$R(T) = \frac{I_{AS}}{I_S} = \left(\frac{\lambda_S}{\lambda_{AS}}\right)^4 \exp\left(-\frac{hcv}{k_B T}\right)$$

where h, c, kB, v and T are Plank constant, the speed of light, Boltzmann constant, Raman wave number shift and absolute temperature in degree K, respectively. A similar equation can be applied for other ratios such as AS to R, both are in same or different bands. The correction method using AS/R ratio instead of AS/S ratio is more effective in terms of the amplitude of DAF (approximately half of AS/S case by an interpolation method) and the smallest temperature dependency of R band. But the amplitude of R is usually a few orders larger than AS band, and it is necessary to correct DAF continuously during all the measurement periods. The challenging job is the process of continuous in-situ correction for DAF and the subtraction of the temperature dependency of S band in high temperature application.

The disclosure in U.S. Pat. No. 7,126,680 described the correction of attenuation related effect of 11S and 11AS by two independent extra reference light sources 12 and 13 (total 3 light sources are required). In this case, several conditions need to be considered to be an effective correction—1) two extra light sources center 1 and their bandwidths should be identical and kept stable. 2) Scattered signals such as anti-Stokes or Stokes bands are much wider than extra laser sources' Rayleigh bands. Also the intensities of two reference light sources should be comparable and compensated to suppress the error related to the momentary fluctuations.

Finally, the temperature effect of the Stokes band is subtracted. The other correction algorithm using two light sources was disclosed in U.S. Pat. No. 4,767,219. In this disclosure, two light sources need to be selected to satisfy the condition that 1/11=1/12=1/v where v is Raman shift in wave number. Another scheme was disclosed in U.S. Pat. No. 7,628,531 by selecting two light sources such as 11AS=12S. For these two light source cases, DAF issue can be corrected automatically because two bands are located in the same center wavelength. But their bandwidth size as well as center wavelengths should be precisely matched and kept stable to ensure the effective correction continues. Also the intensities of secondary light sources should be stabilized to reduce temperature error related to the momentary fluctuations of the source. Last, the nature of temperature dependency of the S band should be subtracted. Because of various issues mentioned so far, the ideal correction method is to use the ratio between AS and R, which has the same wavelength bands with comparable amplitude. For continuous correction approaches, the following one source, two sources and 3 sources method have been disclosed as described below.

The idea using AS band to R band ratio with three sources was disclosed in U.S. Pat. No. 7,284,904. In this scheme, 3 lights 11 (primary light), 1-1 and 11LO (two auxiliary lights) were proposed for the scheme. 11LO is the light source with same wavelength as 11 but has lower optical power and 1-1 source is same wavelength as 11AS generated by 11. DAF correction was claimed by two auxiliary spectral bands 11LO and 1-1 by normalization and interpolation. But interpolation is an indirect correction method, and there may be a practical implementation limit to match and keep the wavelengths stable. Another auto correction method between the anti-Stoke band and R band with one light source was disclosed in U.S. Pat. No. 7,350,972. To generate R band match to AS band, a semiconductor laser was operated in two modes, from a laser mode (stimulated emission) to an LED mode (spontaneous emission) by applying the driving current under threshold level consecutively. In the LED mode, the spectral width is widened but the light intensity is also significantly decreased under impractical level. This simple auto-correction scheme has two concerns: 1) LED mode's spectral band should be wide enough to cover both whole AS band and its original R band, which is separated around 50 to 100 nm in a single side of the band (depends on operating 1, 800 nm to 1550 nm) from R band, and 2) its output power of LED mode should be high enough to be a practical implementation.

BRIEF SUMMARY OF THE INVENTION

Figure 1:
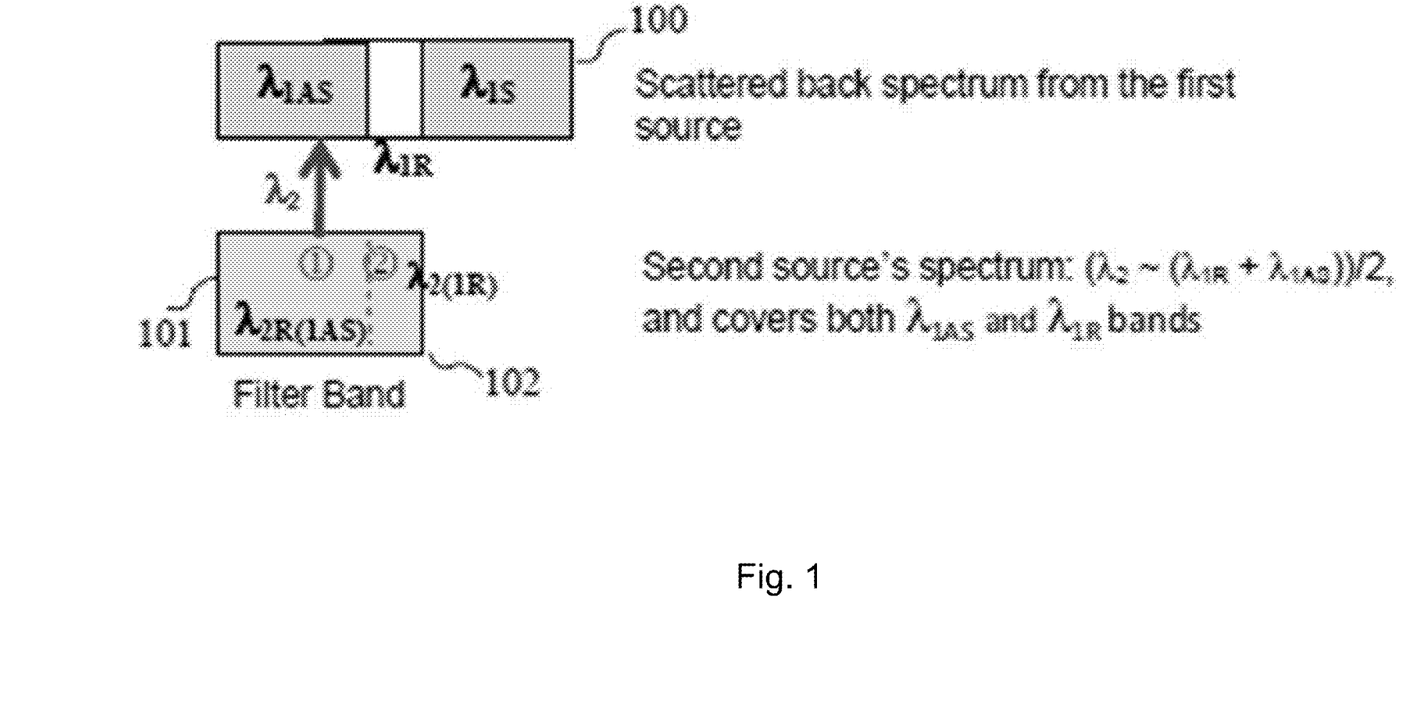
FIG. 1 shows a spectral requirement of the disclosure with filter outputs.

In present disclosure, a novel automatic DAF correction method, which can be applied to all of OTDR, OFDR and multiple pulse coded DTS schemes is introduced. This method is based on two light sources scheme, which satisfy the following three conditions: 1) the center wavelength of the second light sources 12R is selected to be located near the middle of first AS and R bands (i.e., (11AS+11R)/2), 2) its spectral bandwidth is wider enough to cover the entire AS and R band of 11, and 3) the second light source has an output high enough to be a practical implementation. The light source classified as SLD (Superluminescent Diode), which has the combined characteristics of a laser and a LED, or other broadband source can be used for this purpose. SLD sources are commercially available from manufacturers such as Superlum, Q-Photonics, Thorlabs, Dense Light and Exalos. These manufacturers have various product lines of wavelengths and output level. Then temperature calculation and the auto correction is made through the ratio of same bands signals i.e., 11AS A2R(1As), where 12R,1AS, is the Rayleigh band of the second source, whose spectra are overlapped by the first source's 11AS. The other band of the second light source, 12R, R1, 2, is used for the compensation of instantaneous variations of the band 12R(1AS) as illustrated in FIG. 1.

This new disclosure can provide a reliable and accurate temperature calculation by 1) auto correcting the DAF issue and 2) wide temperature range application without the temperature effect subtraction from the Stokes band because this scheme utilizes the ratio of temperature sensitive Anti-Stokes and temperature insensitive Rayleigh signals, both are located in same spectral bands and 3) continuously compensating the fluctuations in the light source output intensities.

This scheme utilizes two light sources, which have the following three matching conditions. First, the center wavelength of the secondary light source is located at the middle of primary light's AS band plus R band. Second, the spectral bandwidth (total R bandwidth) of the secondary source is wide enough to cover the primary light's AS band plus R band. Third, the amplitude of the secondary source needs be comparable (in similar range) to the primary light's AS intensity. Commercially available broadband and high power devices such as SLD sources can be used for these implementations.

The primary and secondary light sources are selected alternately and consecutively by an optical switch or by applying a group of electrical pulses following their time sequences.

Temperature calculation is made by the ratio of AS band of the primary light and R band of the secondary light, both located in the same spectral band as described above. In this case, DAF issue is automatically corrected.

The instantaneous output fluctuations of both light sources are monitored continuously by the external light detecting device (such as a photo diode). The transmitted light is selected by the coupler to separate most light to the sensing fiber and a small portion to the light detecting device. The internal light detecting device mounted in the light source can be used for the alternative.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

FIG. 1 shows the spectral requirements to select the secondary light source. The top figure illustrates 3 spectral bands 100 of the first (or primary) light source, anti-Stokes, Rayleigh and Stokes respectively. The bottom figure shows the secondary source's spectral components. The center wavelength of the secondary is selected to be located in the middle of anti-Stokes 101 and Rayleigh bands 102 of the primary source and are wide enough to cover both spectral bands. A three port (one input and two outputs) wavelength selector is used to select two bands, $\lambda_{1AS}$, $\lambda_{1R}$, or $\lambda_{2R,1AS}$ and $\lambda_{2R,1R}$ or $\lambda_{2,1R}$.

Figure 2:
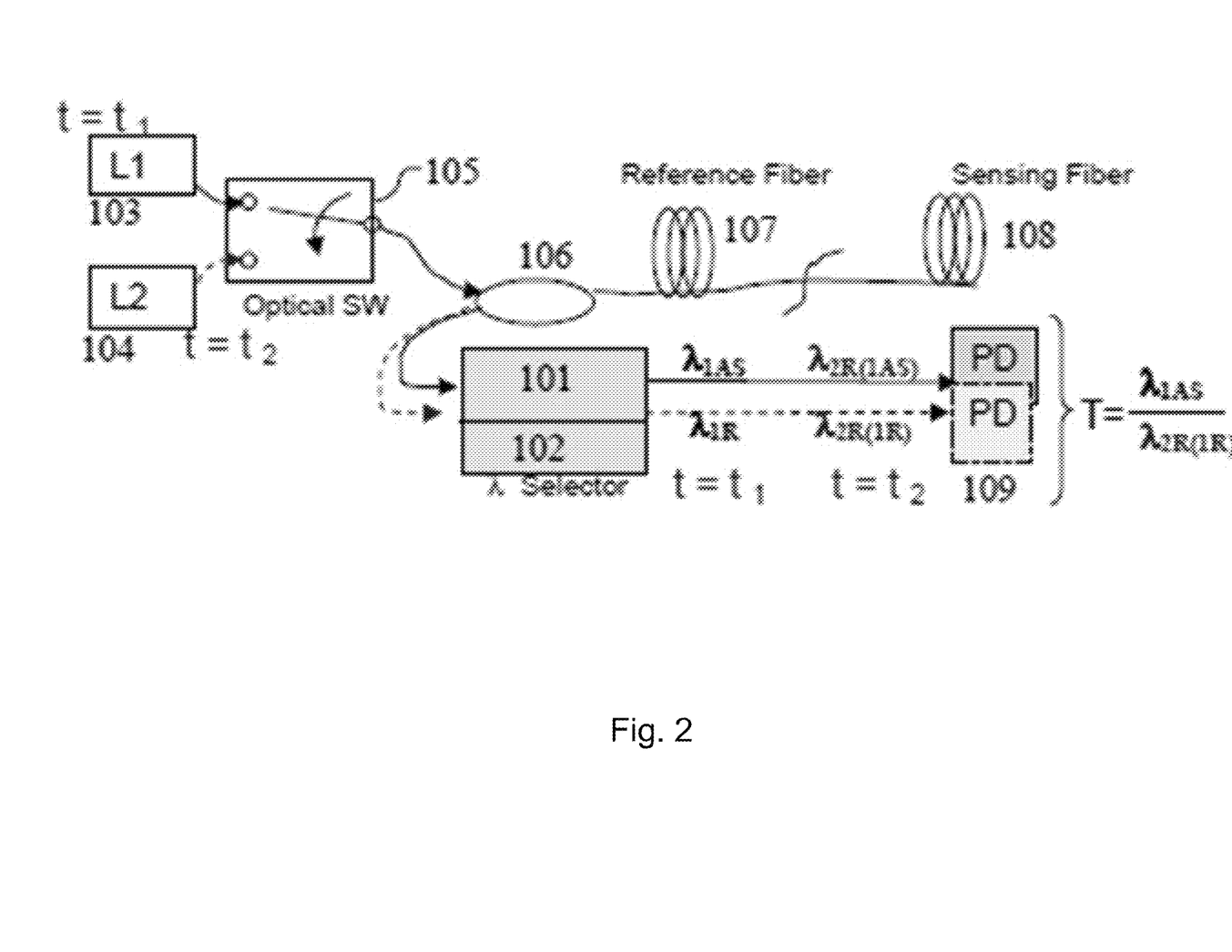
FIG. 2 shows a system configuration of a correction system with a switching device.

FIG. 2 shows the embodiment of the system diagram. Two light sources, the primary source 103, L1 (conventional laser type) and the secondary 104, L2 (a SLD light source) chosen as the conditions mentioned in the previous page is consecutively selected by an optical switch, 105 to select L1 first (at time=t1) and inject the light to the sensing fiber through the coupler, 106. Its backscattered $\lambda_{1AS}$ and $\lambda_{1R}$ optical signals from the fiber (including the reference, 107, and the sensing portion, 108), are collected at the two output ports, 101 and 102, of the optical filter (or other type of wavelength selector) simultaneously. Then selected two light signals are guided to each photodetector (PD), 109, to convert optical signal to electrical signal for data acquisition process. After finishing t1 process, at time=t2, the light source L2 is selected and the portion of backscattered light R band 101, which has the same spectral band with L1's AS band and the other part of R band 102 are collected simultaneously by the same photodiodes, 109. Then temperature is calculated from the ratio of AS and R, $\lambda_{1As}$ and $\lambda_{2R,1AS}$. Instead of 2 PDs, a single PD can be used by applying an optical switch.

Figure 3:
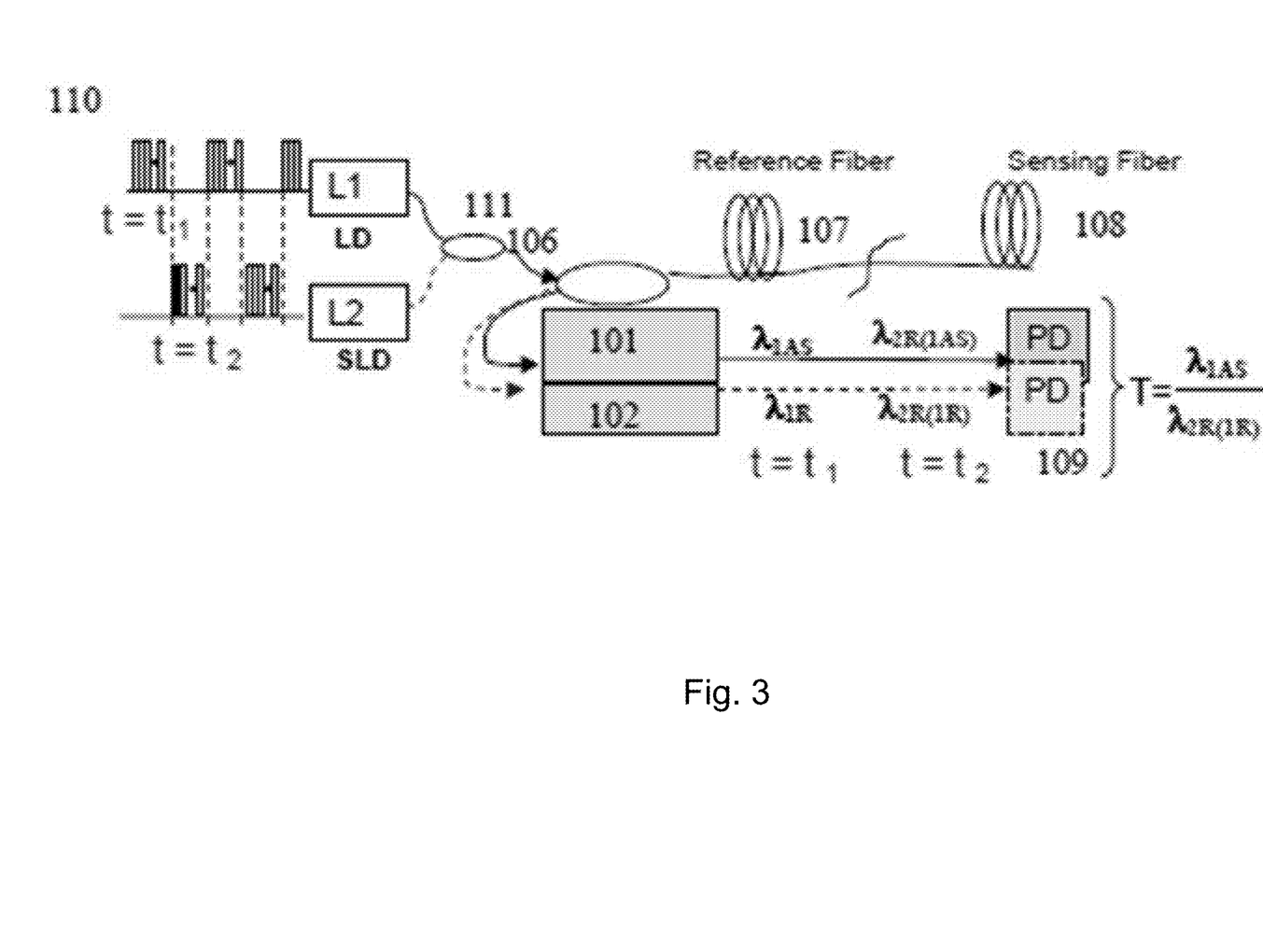
FIG. 3 shows a system configuration of a correction system with an electrical scheme.

FIG. 3 shows the system diagram using an electrical triggering method to select the primary and the secondary light sources by a programmed scheme instead of the optical method described in FIG. 2. The group of electric pulses, 110, (depends on processing time) is selected consecutively to modulate each light source and supplied to the reference and sensing fiber through a fiber coupler 111. For this embodiment, one group of consecutive pulses is generated and selected and applied to each source by an electric switching method.

Figure 4:
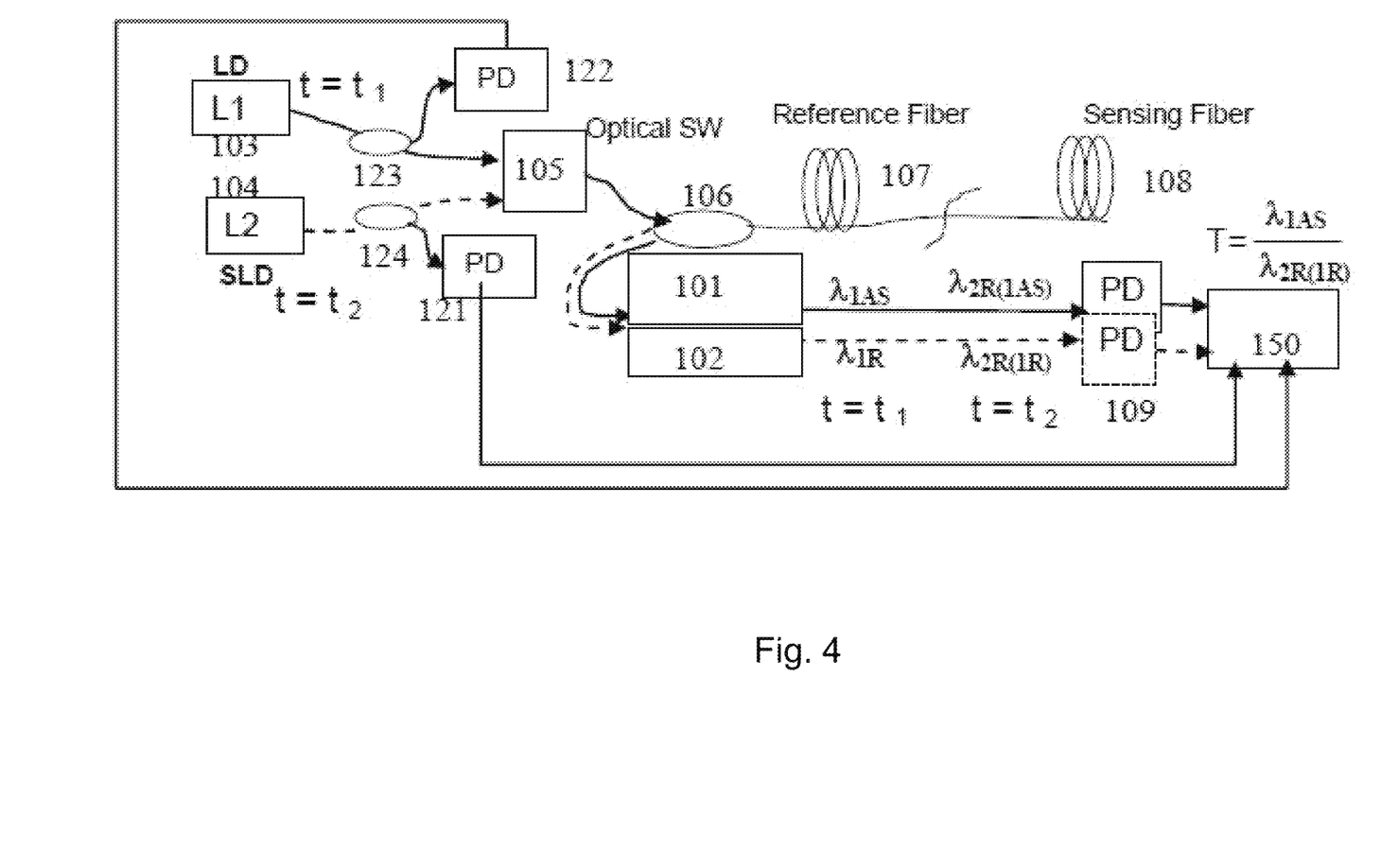
FIG. 4 shows a system configuration of a correction system with external photo detectors.

FIG. 4 shows the embodiment diagram to compensate the instantaneous light output fluctuation by external photo-detectors. Two external photo-detectors, 121 and 121, are dedicated for each light source through the optical couplers, 123 and 124, to split the output to the photo-detector and to the sensing fiber. By selecting the coupling ratio, such as 1 to 99, most of the light (portion of 99%) can be transferred to the sensing fiber for the efficiency of limited light intensity. By this scheme, the light transmission and compensation can be made simultaneously. After the fluctuation is determined by 121 and 122, this amount is used to compensate the auto-corrected temperature calculation continuously at 150 (a signal processor).

Figure 5:
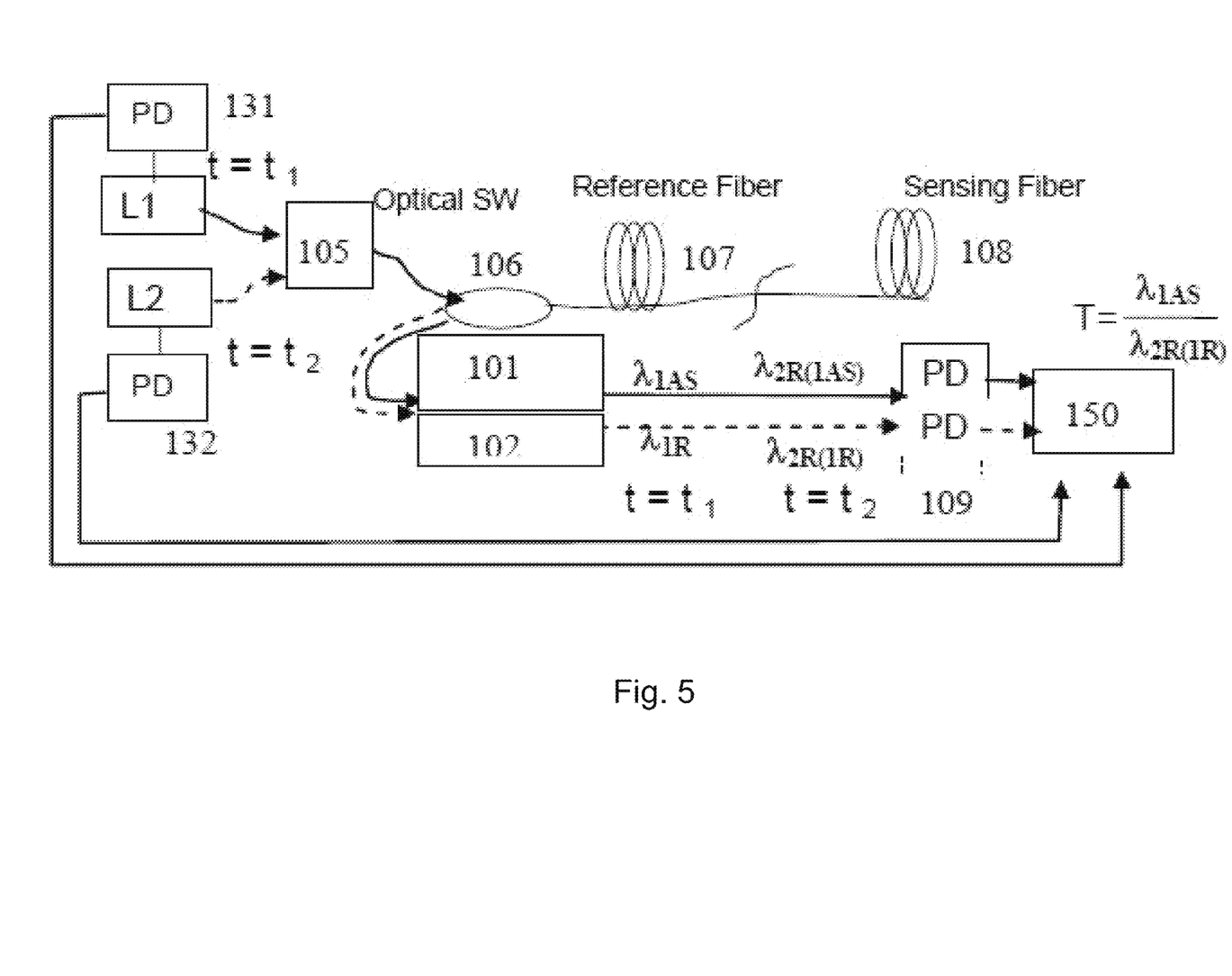
FIG. 5 shows a system configuration of a correction system with internal photo detectors mounted inside of the light sources.

FIG. 5 shows the embodiment diagram to compensate the instantaneous light output fluctuation by internal photo-detectors. Two internally mounted power monitoring photodiodes, 131 and 132, inside of the light sources are utilized for this embodiment. This is a popular, commercially available configuration to monitor the light output variation. By this scheme, the light transmission and compensation can be made simultaneously without any power loss. After the fluctuation is determined by 131 and 132, this amount is used to compensate the temperature calculation at 150.

Figure 6:
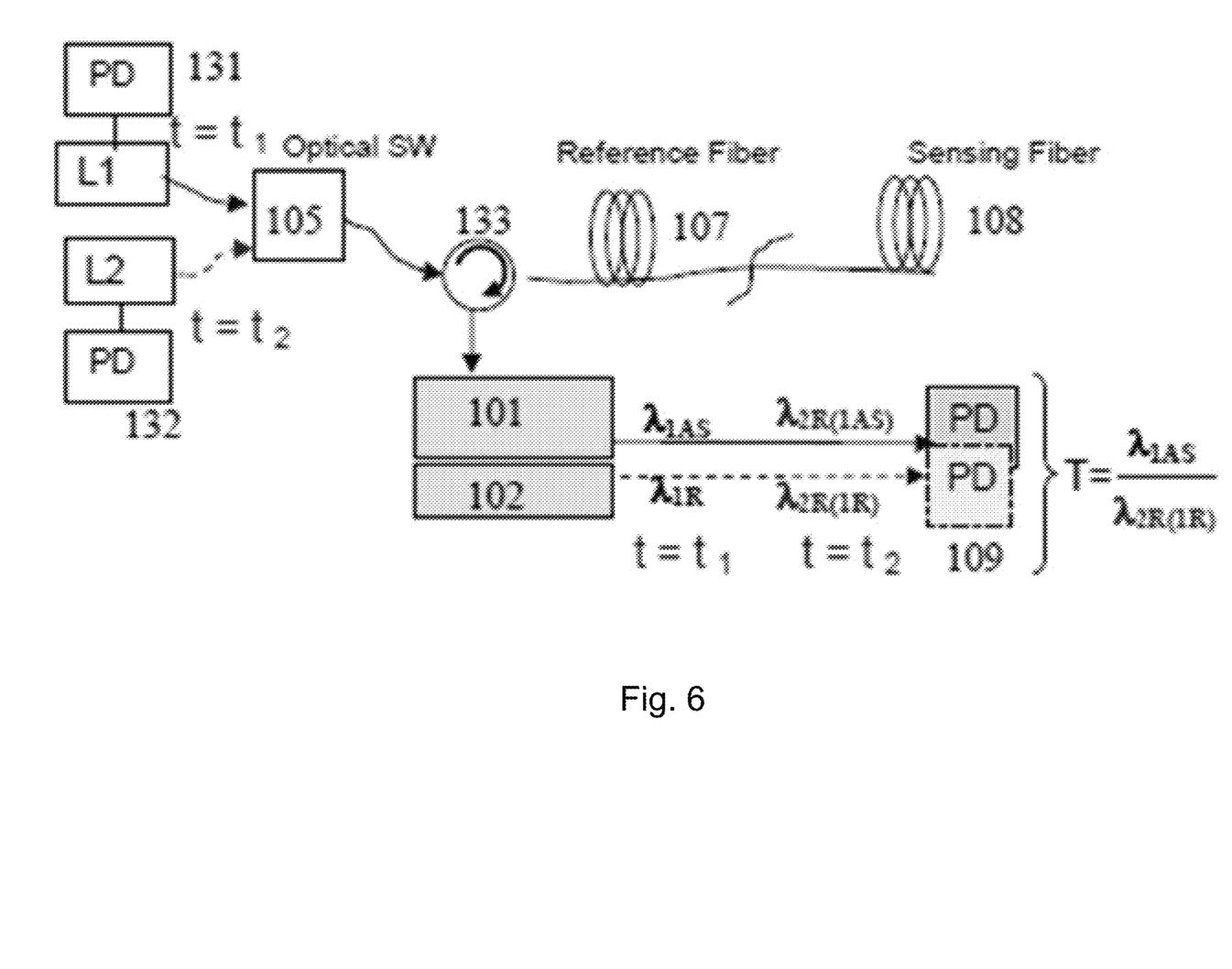
FIG. 6 shows a system configuration of a correction system with an optical circulator.

FIG. 6 shows the embodiment diagram, which uses an optical circulator, 133, instead of fiber optic coupler. This embodiment can save significant optical power loss because of lower insertion loss of the circulator compared to 50:50 fiber couplers, which couples only 50% of optical power for both transmission and reflection.

What is claimed is:

1. A method for automatically correcting a temperature measurement in a distributed system comprising:
    introducing a first light signal into a fiber optic system from a first light source;
    introducing a second light signal into the fiber optic system from a second light source;
    selecting said first and second light sources alternately and consecutively;
    monitoring both said first and second light signals of the fiber optic system; and
    automatically correcting a temperature measurement made by determining a ratio of said first light signal's Anti-Stokes band to said second light signal's Rayleigh band;
    said automatic correction made by continuously compensating for instantaneous fluctuations in an output intensity of said first and second light signals.

2. The method of claim 1 wherein said second light signal comprises: a center wavelength located in the middle of said first signal's Anti-Stokes band plus a Rayleigh band of said second light signal; a spectral bandwidth wide enough to cover said first light signal's Anti-Stokes band plus Rayleigh band; and an amplitude comparable to said first light signal's Anti-Stokes band.

3. The method of claim 1, wherein said first light source is a laser.

4. The method of claim 1, wherein an optical switch performs said alternate and consecutive selecting between said first and second light sources.

5. The method of claim 1, wherein said alternate and consecutive selecting between said first and second light sources is achieved through the application of an optical switching device.

6. The method of claim 1, wherein said alternate and consecutive selecting between said first and second light sources is achieved by electric switching through the application of electrical pulses.

7. The method of claim 1, wherein an external light detecting device performs said monitoring.

8. The method of claim 1, wherein an internal light detecting device performs said monitoring.

9. The method of claim 1, wherein the monitoring of the Stokes and Rayleigh bands are performed by optical filters.

* * * * *